United States Patent

[11] 3,625,405

| [72] | Inventors | Newton P. Kezar<br>Granby;<br>Donald J. McCleary, Neosho, both of Mo. |
|---|---|---|
| [21] | Appl. No. | 835,549 |
| [22] | Filed | June 23, 1969 |
| [45] | Patented | Dec. 7, 1971 |
| [73] | Assignee | Rudolph E. Farber<br>Neosho, Mo.<br>a part interest |

[54] CARRIER AND BRACKET ASSEMBLY FOR MOTORCYCLES
11 Claims, 7 Drawing Figs.

[52] U.S. Cl..................................................... 224/32 A, 280/202
[51] Int. Cl..................................................... B62j 7/04
[50] Field of Search............................................ 224/30, 32, 32.1, 33, 38, 39, 40, 31; 280/202

[56] References Cited
UNITED STATES PATENTS

| 1,030,844 | 6/1912 | Howell ........................ | 224/31 X |
| 1,121,580 | 12/1914 | Burkett & Miller .......... | 224/31 |
| 2,229,756 | 1/1941 | McCann et al. .............. | 224/32 |
| 3,515,322 | 6/1970 | Schneider..................... | 224/32 |

FOREIGN PATENTS

| 220,087 | 6/1942 | Switzerland.................. | 224/30 |
| 1,097,158 | 2/1955 | France ......................... | 224/39 |

*Primary Examiner*—Albert J. Makay
*Assistant Examiner*—George F. Abraham
*Attorneys*—Clarence A. O'Brien and Harvey B. Jacobson ABSTRACT: A strap assembly is provided for mounting to the rear fender of a motorcycle. The strap assembly attaches a rack thereto having a generally flat supporting surface and a pad or cushion fastened to the edge of the rack confronting the motorcycle seat to form a backrest therefor. Instead of the rack, a helmet receptacle may be connected to the strap assembly. The receptacle can be locked to prevent unauthorized opening and theft of the cyclist's helmet. The surface of the receptacle confronting the motorcycle seat is padded to serve as a backrest for a guest passenger.

PATENTED DEC 7 1971

Newton P. Kezar
Donald J. McCleary
INVENTORS

BY *Clarence A.O'Brien*
and *Harvey B. Jacobson*
Attorneys

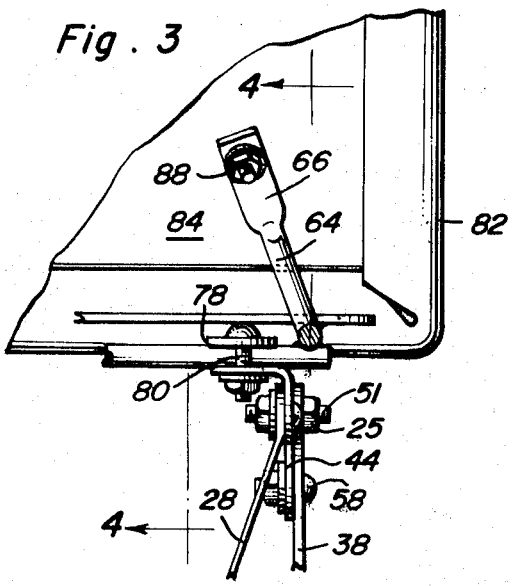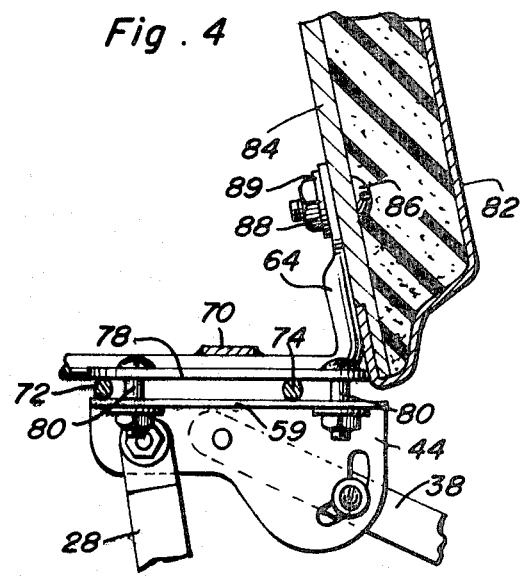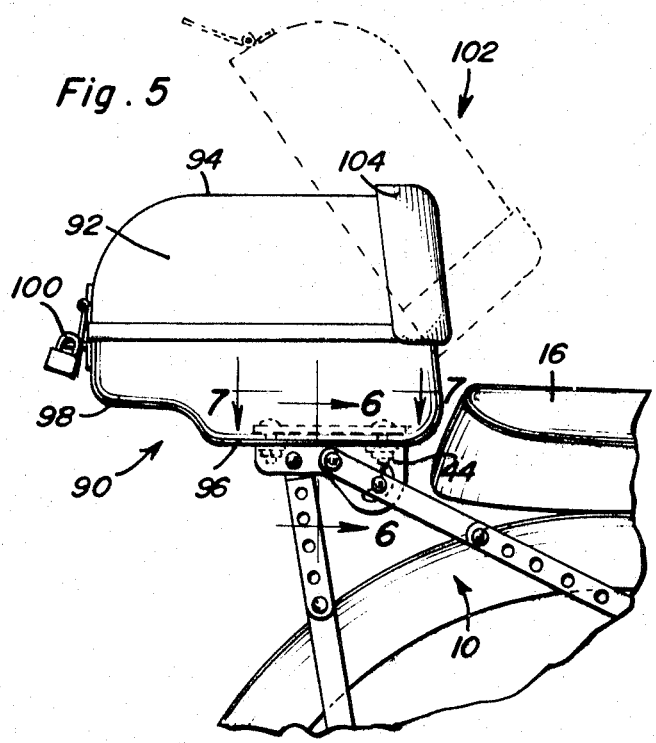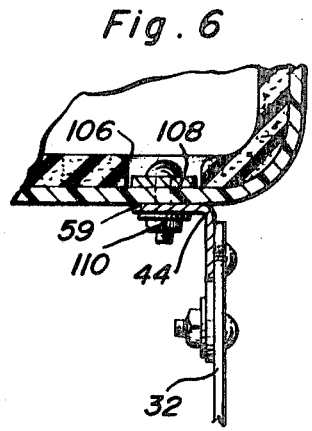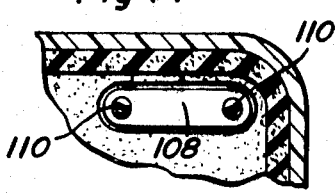

CARRIER AND BRACKET ASSEMBLY FOR MOTORCYCLES

The present invention relates to accessories for motorcycles and bikes.

Generally, motorcycle racks are available as a fixed structure from the manufacturer. However, it is difficult for a cyclist to obtain a universal structure that is adaptable for most motorcycles on the market today. Further, with the racks available, it is impossible in a large number of circumstances to attach a backrest to accommodate a passenger.

A need also exists for a lockable helmet receptacle which assumes a minimum amount of space at the rear portion of the motorcycle.

The present invention includes a strap assembly which may mount a rack or a helmet receptacle. The strap assembly is adjustable so as to accommodate most motorcycles on the market today. The rack includes a backrest mounted thereto to provide comfort for a guest passenger. Instead of the rack, a helmet receptacle may be attached which includes a cushioned surface acting as a backrest for a guest passenger. Thus, the structure of the present invention provides modularized construction offering the cyclist a choice of rack or helmet receptacle to be mounted on the rear portion of his cycle. A further advantage is offered to the distributor of motorcycle accessories due to the fact that the adaptability of the present invention obviates the necessity of stocking and distributing a large number of specifically dimensioned accessories of the present type for the numerous number of motorcycle models available.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a partial sectional view taken along a plane passing through section line 3—3 of FIG. 1.

FIG. 4 is a partial sectional view taken along a plane passing through section line 4—4 of FIG. 3.

FIG. 5 is a partial side elevational view illustrating the disposition of a helmet receptacle on the strap assembly of the present invention.

FIG. 6 is a transverse sectional view taken along a plane passing through section line 6—6 of FIG. 5.

FIG. 7 is a partial sectional view taken along a plane passing through section line 7—7 of FIG. 5.

Figure 1:
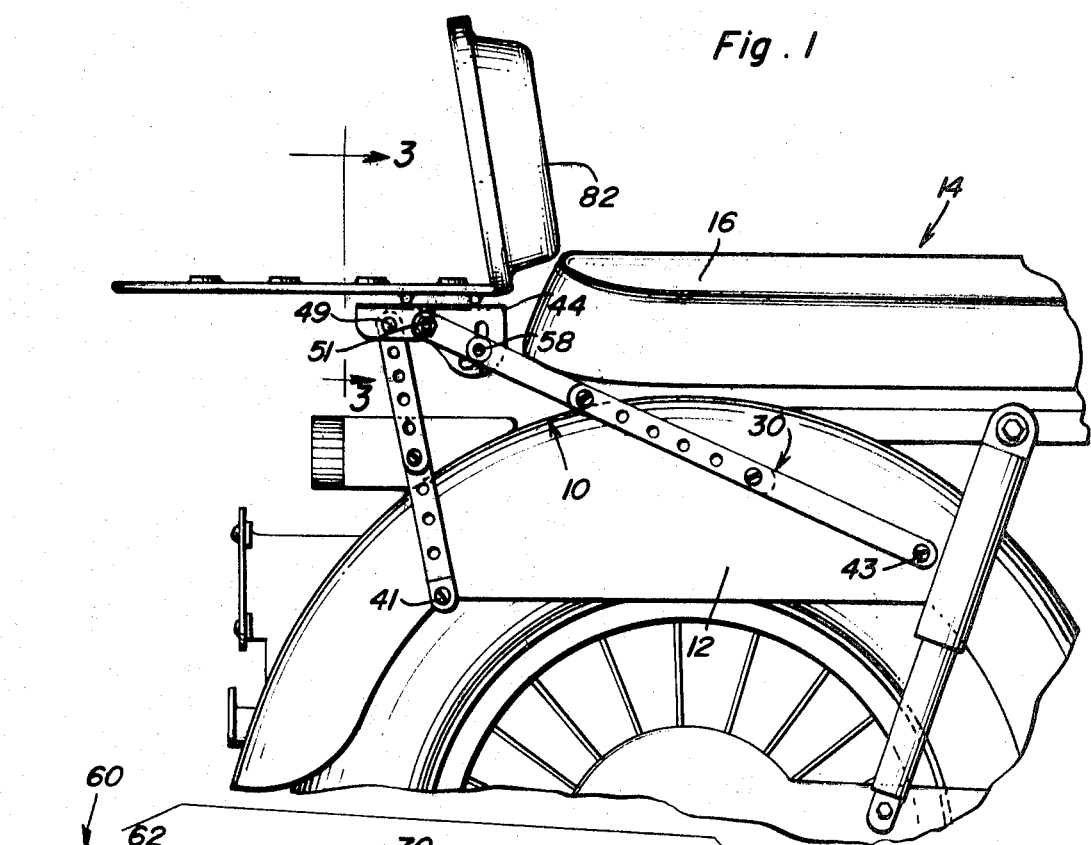
FIG. 1 is a partial side elevational view illustrating the mounting of the present invention to the rear fender of a motorcycle.

Referring to the drawings and more particularly FIG. 1 thereof, reference numeral 10 generally denotes a carrier assembly 10 generic to both the rack and helmet receptacle embodiments of the present invention. As will be noted from the figure, the carrier assembly is secured to the rear fender 12 of a motorcycle generally denoted by 14. The motorcycle includes the conventional seat 16.

Figure 2:
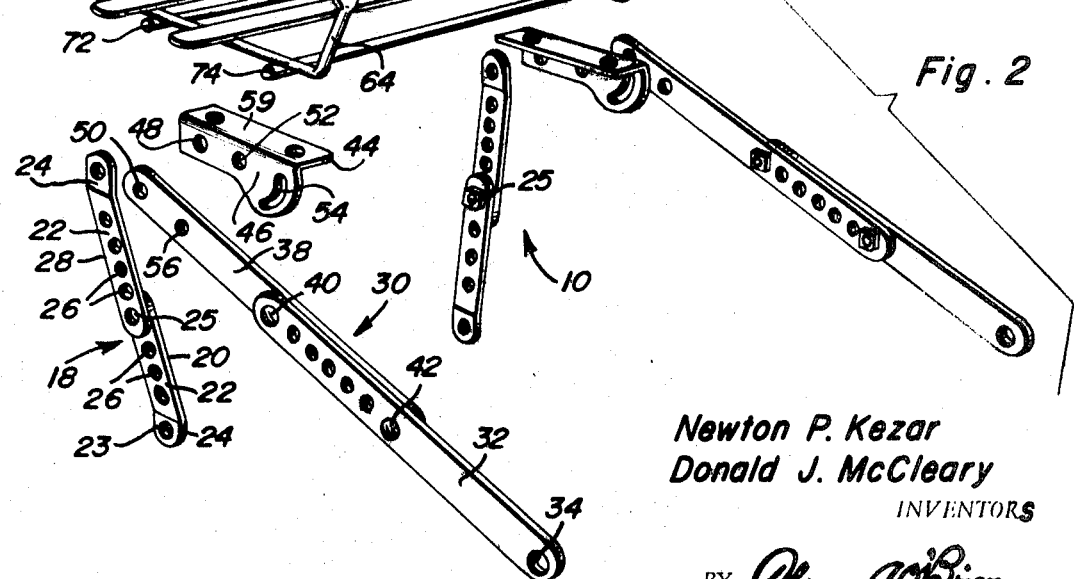
FIG. 2 is an exploded view disclosing the strap assembly employed with both the rack and the helmet receptacle.

Referring to FIG. 2, the carrier support assembly 10 is more particularly seen to include a generic strap assembly including a first strap 18 having first and second link members 20 and 28 respectively. Both link members are identical and include a plate portion 22 having a row of apertures 26 therein. The outward end of the plate 22 includes an offset ear portion 24 having an aperture 23 therein. As indicated in FIG. 2, the strap 18 is more particularly comprised of link members 20 and 28 having the offset ear portions extending in oppositely disposed directions and secured together at the overlying ends thereof by a suitable fastener 25.

A second strap 39 longer than the first strap 18 is comprised of a first link member 32 having an outwardly disposed aperture 34. A second link member 38 is mounted in overlying linear relation with respect to the first link member 32 and is fastened thereto by spaced fasteners 40 and 42 passing through aligned apertures in the overlying link members. As will be noted from FIG. 1, the aperture 23 formed in the lower link member 20 is attached to the rear fender 12 of the cycle by means of a suitable fastener 41. In a similar manner, the lower formed aperture 34 in the strap 30 is fastened to the fender by a suitable fastener 43. As will be apparent from viewing FIGS. 1 and 2, a similarly mounted connection of straps is disposed on the other lateral side of the motorcycle fender. Further viewing FIG. 1, the strap 18 may be characterized as a leg of a triangular configuration wherein the fender itself serves as the base. The hypotenuse of the triangular configuration would be the elongated strap 30. The upper ends of the straps 18 and 30 are retained in slight spaced relation for connection with an angle bracket 44. As FIG. 2 illustrates, the angle bracket 44 includes a first side 46 having an aperture 48 to be aligned with the aperture 24 in strap 18 and retained in the aligned position by means of a suitable fastener 49, as shown in FIG. 1. The angle bracket side 46 further includes an aperture 52 adjacent aperture 48 for receiving an aperture 50, formed in the upper end of link member 38, in aligned position. A fastener 51 retains the aligned apertures 52 and 50 in position. The angle bracket side 46 further includes an elongated arcuate slit 54 which is positioned in overlying relation with an aperture 56 formed downwardly from the aperture 50 in link member 38. By connecting the slot and the aperture with a suitable fastener 58, such as a thumbscrew, the position of strap 30 relative to the bracket 44 may be varied to accommodate the various motorcycles available on the market today.

The second side 59 of the angle bracket 44 serves as a support for both the rack generally indicated by reference numeral 60 or a helmet receptacle discussed hereinafter. The rack includes a U-shaped frame 62 having upwardly and inturned end portions 64 a terminating outwardly in earlike portions 66 having apertures 68 formed therein. It is to these upstanding end portions 64 that a backrest is attached as shown in FIG. 1.

A number of plates 70 lie transversely of the frame 62 and are connected to the lateral sides of the frame. These plates serve to support luggage, books or the like. Rodlike members 72 and 74 are connected to the underside of the frame 62 and are disposed in parallel-spaced relation to the plates 70, as clearly shown in FIG. 2.

Referring to FIGS. 3 and 4, the mounting of the rack to the strap assembly is shown. To effect such mounting, a plate 78 is disposed in overlying relation with respect to the rods 72 and 74. The latter-mentioned plate includes apertures formed at the opposite ends thereof to receive fasteners 80 therein which pass through aligned apertures formed in the horizontally disposed side 59 of angle bracket 44. Thus, the rack is clamped to the angle bracket. Of course, a similar relation between parts exists on the oppositely disposed side of the fender.

A comfortable pad or cushion 82 is connected to the upstanding end portions 64 by means of passing suitable fasteners 86 through a rearwardly positioned solid base 84. The fastener 86 may be a threaded bolt having a nut 88 and washer 89 connected at the outward end thereof.

Referring to FIG. 5, it will be observed that the rack 60 may be replaced by a helmet receptacle generally indicated by reference numeral 90 which houses a cyclist's helmet 92 therein. The receptacle includes a pivotally mounted lid 94 which may be opened to permit insertion and withdrawal of the helmet. The base portion 96 of the receptacle includes a flat portion attached to the angle brackets 44. The rearward contour 98 of the base 96 is tapered upwardly to match the normal contour of a cyclist's helmet, thereby reducing vibration of the helmet in the receptacle to a minimum. A conventional lock 100 secures the lid and base portions of the receptacle together thereby preventing unauthorized withdrawal of the helmet. The position of the opened lid is generally indicated by reference numeral 102. As will be seen in FIG. 5, a pad or cushion 104 is attached to the surface of the lid 94 which is oppositely disposed from the rearward portion of the lid to which the lock 100 is attached. Otherwise stated, the pad 104 is disposed over the rearmost portion of the seat 16 to serve as a backrest for a guest passenger.

In order to appreciate the means for mounting the helmet receptacle to the carrier support assembly 10, attention is directed to FIG. 6 wherein there is shown counterbored recesses 106 formed in the base of the helmet receptacle. The recess is elongated to accommodate a plate 108 therein having apertures at the opposite ends thereof. The plate 108 is substantially identical to the plate 78 illustrated in FIGS. 3 and 4. Suitable fasteners 110 pass through the plate 108 and the aligned apertures in the upper side 59 of angle bracket 44. The purpose for including plate 108 in the latter construction is for relieving strain on the helmet receptacle exerted by the fasteners 110.

It is to be emphasized that although the present invention is described in the environment of a motorcycle, by varying the dimensions of the structural members, the invention may be adapted to a bicycle, motor scooter or similar vehicle.

By eliminating the upwardly extending end portions 64, the rack 60 may be used without any backrest. In this event, the frame 62 may be rectangular instead of U-shaped as illustrated in FIG. 1. Thus, the rack may be used alone with or without end portions 64 or with a backrest attached to the end portions 64. The rack may be omitted and the helmet carrier substituted therefor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A carrier support assembly adapted for mounting to the rear fender of a motorcycle comprising a plurality of straps each having upper and lower ends, said lower ends thereof pivotally attached to the rear fender, at least one bracket pivotally connecting said upper ends of said straps to produce a rigid structure, and article carrier means connected to said bracket, said bracket including an elongated slot therein, means adjustably securing the bracket to at least one of the straps through the slot to permit adjustment of the bracket's position relative to the straps.

2. The device set forth in claim 1 wherein the article carrier means is a closed housing having a lid and means for locking the lid in place to prevent unauthorized opening of the housing.

3. The device set forth in claim 2 wherein the housing lid includes a pad attached thereto in confronting relation with the rear end of the motorcycle seat to serve as a backrest.

4. The device set forth in claim 1 wherein the plurality of straps includes two sets of spaced strap assemblies mounted on the lateral sides of a motorcycle fender in opposed confronting relationship the components of the strap assembly being transversely aligned.

5. The device set forth in claim 4 wherein each of said strap assemblies includes a plurality of alignable holes in overlapping strap components to enable length adjustment thereof, the upper end of each strap assembly being pivotally connected to said bracket, said elongated slot being arcuate with the center of curvature coinciding with the pivotal connection between the bracket and a strap component overlying the slot, and bolt means extending through the slot and overlying strap component to secure the bracket and strap component in angularly adjusted position.

6. The device set forth in claim 5 wherein the article carrier means is a flattened rack suitable for supporting articles thereon.

7. The device set forth in claim 5 wherein the article carrier means is a receptacle adapted to retain a helmet therein.

8. The device set forth in claim 6 wherein the rack includes upstanding legs to which is attached a backrest being positioned adjacent the rear end of the motorcycle seat.

9. A carrier support assembly for mounting to the rear of a motorcycle comprising a housing adapted to be said behind the motorcycle seat and above the rear fender, a pad attached to said housing in confronting relationship to the rear end of the motorcycle seat to serve as a backrest, and means for fastening said housing to the rear of the motorcycle, said housing including a lid, and said pad being attached to the lid.

10. The device set froth in claim 9 wherein said pad is located in an area above the longitudinal axis of the motorcycle seat.

11. A carrier support assembly adapted for mounting to the rear fender of a motorcycle comprising a plurality of straps each having upper and lower ends, said lower ends thereof pivotally attached to the rear fender, at least one bracket connecting said upper ends of said strap to produce a rigid structure, and article carrier means connected to said bracket, said plurality of straps including two sets of spaced strap assemblies mounted on the lateral sides of the motorcycle fender in opposed confronting relationship, the components of each strap assembly being transversely aligned with respect to the opposite strap assembly, each of said strap assemblies having a plurality of alignable holes in overlapping strap components to enable length adjustment thereof, the upper end of each strap assembly being pivotally connected to said bracket.

* * * * *